United States Patent
Armstrong

(10) Patent No.: US 10,896,448 B2
(45) Date of Patent: Jan. 19, 2021

(54) INTERFACE FOR CONFIGURING ONLINE PROPERTIES

(71) Applicant: Google LLC, Mountain View, CA (US)

(72) Inventor: Timothy M. Armstrong, Riverside, CT (US)

(73) Assignee: Google LLC, Mountain View, CA (US)

( * ) Notice: Subject to any disclaimer, the term of this patent is extended or adjusted under 35 U.S.C. 154(b) by 1042 days.

(21) Appl. No.: 15/149,789

(22) Filed: May 9, 2016

(65) Prior Publication Data

US 2016/0267555 A1    Sep. 15, 2016

Related U.S. Application Data

(63) Continuation of application No. 11/924,544, filed on Oct. 25, 2007, now abandoned.

(60) Provisional application No. 60/862,977, filed on Oct. 25, 2006.

(51) Int. Cl.
| | |
|---|---|
| *G06Q 30/02* | (2012.01) |
| *H04L 12/24* | (2006.01) |
| *H04L 29/08* | (2006.01) |

(52) U.S. Cl.
CPC ......... *G06Q 30/0277* (2013.01); *G06Q 30/02* (2013.01); *G06Q 30/0205* (2013.01); *G06Q 30/0263* (2013.01); *G06Q 30/0269* (2013.01); *G06Q 30/0273* (2013.01); *G06Q 30/0275* (2013.01); *H04L 41/22* (2013.01); *H04L 67/02* (2013.01); *H04L 67/20* (2013.01)

(58) Field of Classification Search
CPC .................. G06Q 30/0207–30/0277
USPC ..................................... 705/14, 319
See application file for complete search history.

(56) References Cited

U.S. PATENT DOCUMENTS

| | | | |
|---|---|---|---|
| 7,665,107 B2 | 2/2010 | Goodman et al. | |
| 7,921,124 B1 | 4/2011 | Bickerstaff | |
| 8,135,799 B2 | 3/2012 | Mekikian | |
| 2002/0107787 A1 | 8/2002 | Mashinsky et al. | |
| 2002/0161739 A1 | 10/2002 | Oh | |
| 2002/0178054 A1 | 11/2002 | Ader | |
| 2003/0060247 A1 | 3/2003 | Goldberg et al. | |

(Continued)

OTHER PUBLICATIONS

International Search Report for International Application No. PCT/US 07/82574, dated Oct. 24, 2008.

(Continued)

*Primary Examiner* — Luis A Brown
*Assistant Examiner* — Richard G Reinhardt
(74) *Attorney, Agent, or Firm* — Fish & Richardson P.C.

(57) ABSTRACT

Systems, methods, and apparatus, including computer program products, for configuring online properties, such as content pages of a website, through an online user interface. A system generates the online user interface and receives, over a network and through the online user interface presented by a client device, a request to insert a restricted third party file into a user's online property. The online user interface is updated to inform the user that inclusion of the third party file in the user's online property is restricted and to provide the user with options for satisfying requirements for including the third party file in the user's online property. In response to detecting a user selection of at least one of the options, the restricted third party file is received from a content repository, and is inserted into the user's online property.

20 Claims, 8 Drawing Sheets

(56) References Cited

U.S. PATENT DOCUMENTS

| | | |
|---|---|---|
| 2003/0131095 A1 | 7/2003 | Kumhyr et al. |
| 2003/0191816 A1 | 10/2003 | Landress et al. |
| 2004/0041836 A1 | 3/2004 | Zaner et al. |
| 2005/0119936 A1* | 6/2005 | Buchanan ............... G06F 16/95 705/14.55 |
| 2006/0200435 A1 | 9/2006 | Flinn et al. |
| 2006/0242581 A1 | 10/2006 | Manion et al. |
| 2007/0022032 A1 | 1/2007 | Anderson et al. |
| 2007/0078773 A1* | 4/2007 | Czerniak ............... G06Q 30/00 705/57 |
| 2007/0121843 A1 | 5/2007 | Atazky et al. |
| 2007/0130012 A1 | 6/2007 | Yruski et al. |
| 2007/0162335 A1* | 7/2007 | Mekikian ........... G06Q 30/0252 705/14.5 |
| 2007/0239541 A1 | 10/2007 | Kane et al. |
| 2008/0046925 A1* | 2/2008 | Lee .................... G06F 16/7335 725/37 |
| 2008/0066107 A1 | 3/2008 | Moonka et al. |
| 2008/0103879 A1 | 5/2008 | Armstrong |
| 2008/0103896 A1 | 5/2008 | Flake et al. |
| 2012/0030031 A1 | 2/2012 | Armstrong |

OTHER PUBLICATIONS

Authorized officer Simin Baharlou, International Preliminary Report on Patentability in PCT/US2007/082574, dated May 7, 2009, 5 pages.

\* cited by examiner

Add/Change Videos

300

Show for: Today | Week | Month | All

302

304

Video A
Plays 34883
Comments 3323

Video B
Plays 3399
Comments 39

Video C
Plays 3223
Comments 36

Video D
Plays 2383
Comments 53

Video E
Plays 343
Comments 33

Video F
Plays 113
Comments 3

Video G
Plays 222
Comments 131

Video H
Plays 1112
Comments 132

Select Video(s)

Listing 1-8 of 1000    1 2 3 4 5 >> of 84    Next >>

FIG. 3

Add/Change Advertisers

Posting of Video A is restricted. Video A can be posted in your personal space for free, or for a discount, if it is posted with an ad sponsored by one of the advertisers listed below.

Select An Advertiser For Video A:

Advertiser A (Learn More) ☐

Advertiser B (Learn More) ☐   402

Advertiser C (Learn More) ☐

. .

Advertiser N (Learn More) ☑

[ Add selected video(s) and ads from selected advertiser(s) to my content. ]

[ Select ads from selected advertiser(s). ]

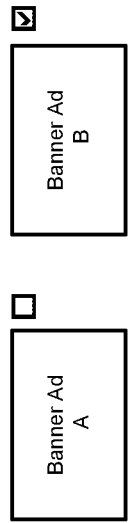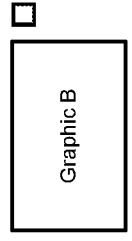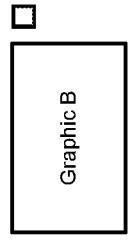
FIG. 5

INTERFACE FOR CONFIGURING ONLINE PROPERTIES

BACKGROUND

The subject matter of this specification is generally related to online advertising.

Online communities allow users to share photos, journals, interests, and other user-generated content with a network of mutual friends on a communications network, e.g., using for example the World Wide Web ("the Web"). Users can sign-up or join the community and create a profile. A profile can be a space in the community (e.g., on the Web) where a user can describe themselves, hobbies and interests. Profiles can include mechanisms for uploading content, such as pictures, videos and other content. Users can create a personal network and invite others to join the network. Some online communities provide a place on the Web where people can share personal videos.

Participants in the online communities or in the companies that administer the online communities can use ads to generate revenue. Advertisers can target advertising to users based on the user's profile or content posted on the user's space. Successfully targeting ads to users of online communities can be challenging.

SUMMARY

In general, one aspect of the subject matter described in this specification can be embodied in methods that include the actions of receiving input from a user specifying one or more content items for inclusion in a property; determining whether the user satisfies one or more user criteria and whether the specified content items satisfy one or more content criteria; and if the user satisfies the user criteria and the specified content items satisfy the content criteria, then receiving input identifying one or more sponsors, and presenting the specified content items and content provided by the identified sponsors in the property. Other embodiments of this aspect include corresponding systems, apparatus, computer program products, and computer readable media.

Particular embodiments of the subject matter described in this specification can be implemented to realize one or more of the following advantages. Users can obtain content for sharing in a social network without fear of liability for copyright infringement. Content providers are compensated for distribution of their content in social networks. Content providers can expand audiences and generate publicity for their content. Advertisers can expand audiences for their advertisements.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 illustrates an example user interface for allowing a user to add or change media content.

FIG. 4 illustrates an example user interface for allowing a user to select an advertiser associated with video content.

FIG. 5 illustrates an example user interface for allowing a user to select an ad associated with video content and an advertiser.

Like reference numbers and designations in the various drawings indicate like elements.

DETAILED DESCRIPTION

Advertising System Overview

Figure 1:
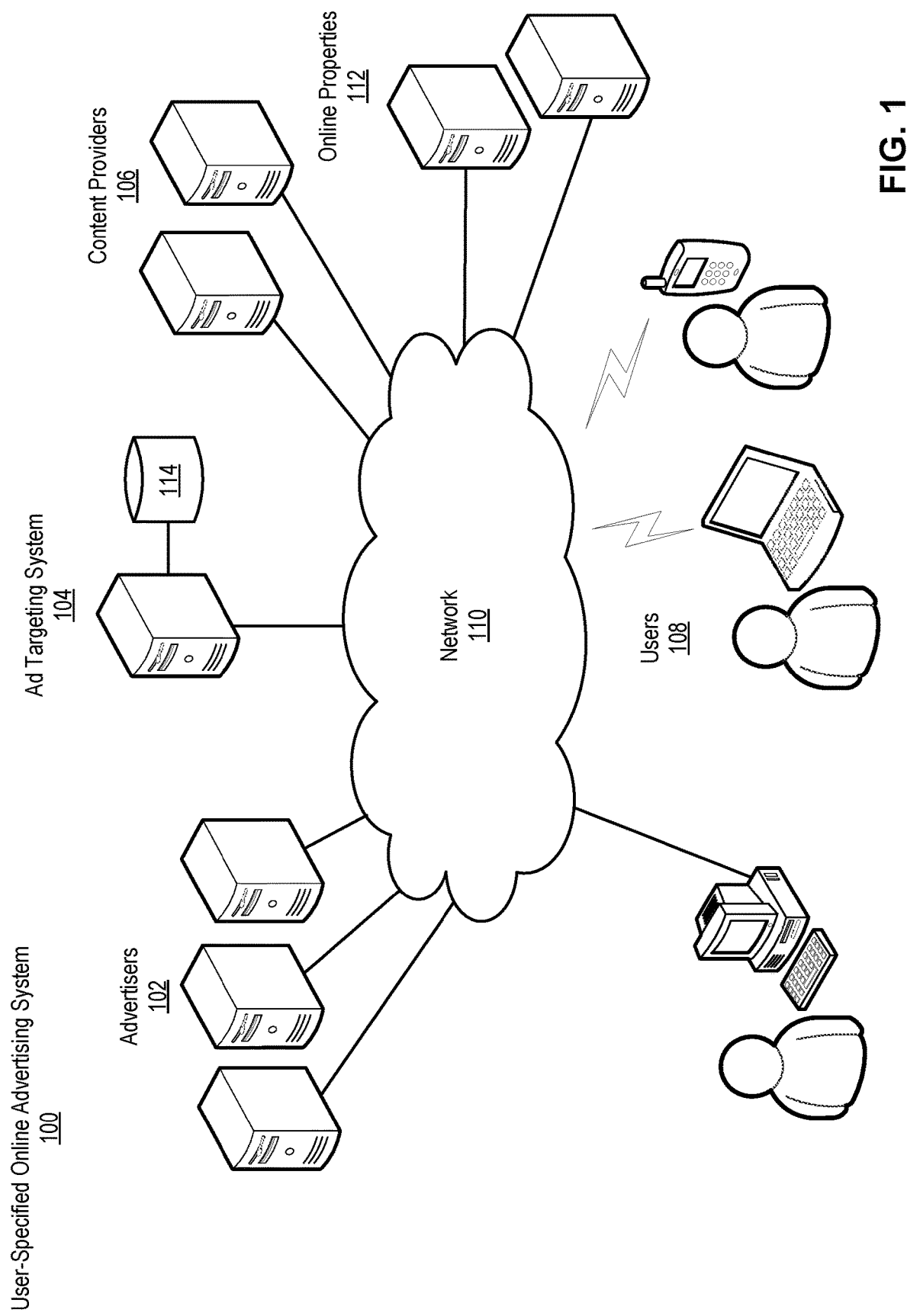
FIG. 1 is a block diagram of an example user-specified online advertising system.

FIG. 1 is a block diagram of an example user-specified online advertising system 100. The system 100 includes advertisers 102, ad targeting system 104, content providers 106, users 108 and online properties 112. Each of these entities can be coupled to a network 110 (e.g., the Internet) using one or more communication channels (e.g., wireless, optical, Ethernet).

In some implementations, the ad targeting system 104 is an ad serving program run by an ad network service provider. Website owners can enroll in a program to enable text, image and video advertisements on their sites. These ads can be administered by the ad targeting system 104 and generate revenue on a per-click, per-thousand-impressions, cost-per-action or other basis. In some implementations, the ad targeting system 104 utilizes search technology to serve ads based on website content, the user's geographical location and other factors. The ad targeting system 104 can provide an online environment with user interfaces for facilitating interaction between advertisers 102, content providers 106 and users 108. The ad targeting system 104 is operatively coupled to a storage device 114 for storing information associated with ad targeting.

The online properties 112 can be, for example, an online service that provides users with a personal space for sharing interests, hobbies, information and content with other users. Some examples of online properties 112 include but are not limited to social networking sites and audio (e.g., music) or video sharing sites.

In some implementations, users 108 select content from an inventory of content, published by content providers 106, that is available for posting on online properties 112, and advertisers 102 sponsor (e.g., at least partially compensate the content providers 106 for the right of) the users 108 to post the content on the online properties 112. In some implementations, the content is restricted and licensed for posting with sponsorship. In exchange, the user authorizes one or more of the advertisers 102 to run ads in association with the user's content, e.g., in association with the user's profile or other content. Thus, the users 108 can receive access to premium content, which is at least partially paid for, provided or otherwise sponsored by the advertisers 102 that have been selected by the user. A user 108, by posting content that is of interest to themselves and/or their personal network, can become a part of the ad targeting process. In some implementations, the user 108 has to meet one or more criteria (e.g., demographics, popularity ratings) specified by the advertisers 104, content providers 106 and/or ad targeting system 104 before the user is allowed to post the content.

Exemplary User Interface for Online Property

Figure 2:
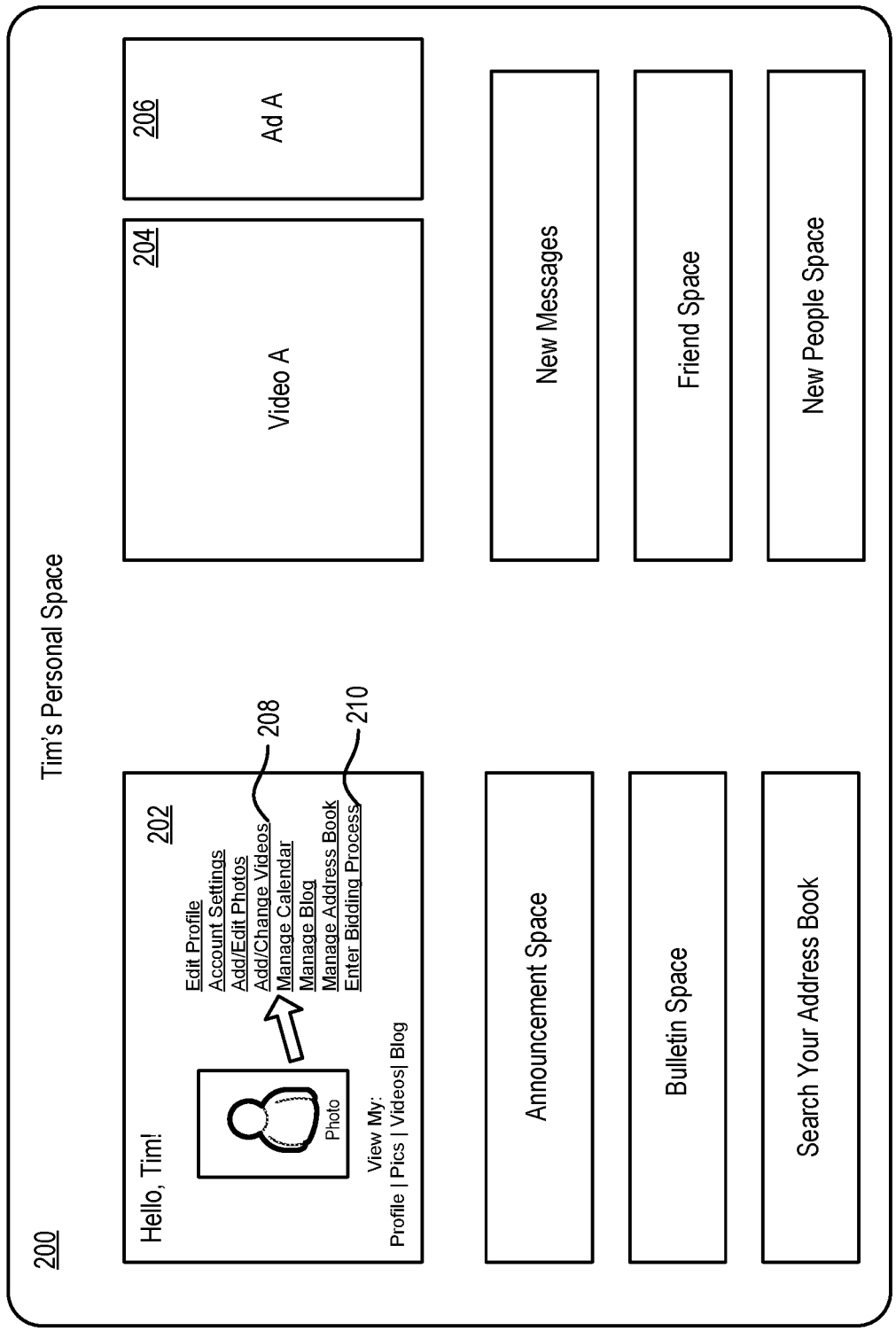
FIG. 2 illustrates an example user interface for an online property that allows a user to select and post content.

FIG. 2 illustrates an example user interface 200 for an online property that allows a user to select and post content. In the example shown, the online property provides a "personal" space in which a user can share interests, hobbies, content and other information. Other configurations for user interfaces are possible.

The user interface 200 includes a management space 202, which includes various links and/or other user interface elements for allowing the user to manage their personal space. For example, the user can edit their profile, change account settings, add/edit photos, add/change videos, manage a calendar, manage a weblog (also "blog"), manage an address book, etc.

The user interface 200 can include one or more spaces for displaying information and content, such as an "Announcement" space for posting announcements, a "Bulletin" space for posting bulletins, a "Search Your Address Book" space for searching an address book, a "New Message" space for displaying new emails or Instant Messages, a "Friend" space for listing members of the user's personal network, a "New People" space for introducing new people recently added to the user's personal network, etc.

In some implementations, a user can add videos and other content to their personal space. Video content can be displayed in video display 204. In some implementations, the video display 204 displays a particular video that was added by the user to their personal space, as well as controls for controlling the playback of the displayed video. In some other implementations, the video display 204 displays a list of videos added by the user to their personal space, including information associated with the videos such as video titles, lengths, and sample frames. In some further implementations, a video is displayed in the video display 204 and a list of videos added by the user to their personal space is displayed in another area on the user interface 200. An ad display 206 for displaying targeted advertisements that are relevant to the video content can be presented proximate to the video display 204. For example, in FIG. 2, Video A is displayed in the video display 204 and Ad A is displayed in the ad display 206. Alternatively, ads can be embedded in (e.g., prepended or appended to) or overlaid on the video content. Ads can include images, text information and/or links (e.g., a Universal Resource Locator (URL)) to resources operated by or on behalf of advertisers or other content. A system for targeting ads to video clips is described in U.S. patent application Ser. No. 11/550,388, for "Using Viewing Signals in Targeting Video Advertisements," filed Oct. 17, 2006, which patent application is incorporated by reference herein in its entirety.

In some implementations, a user can enter into a bidding process by, for example, clicking the link 210. Some "super" users (e.g., celebrities/influencers) may have popular online properties that advertisers can bid on. In such cases, the user can enter into a revenue sharing scheme with the ad targeting service provider. For example, the "super" user can receive some portion of the advertising revenue and the ad targeting service provider can receive some portion. In some implementations, the user is compensated with a "pass" that provides the user with access to other premium content. Other compensation and revenue sharing schemes are possible.

If the user wants to add or change content, e.g., a video or music, listed on (and accessible via) their personal space, the user can click on the link 208 to invoke an interface for selecting content and advertisers, as described in reference to FIGS. 3-6.

User Interfaces for Content, Advertiser, Ad Selection

FIG. 3 illustrates an example user interface 300 for allowing a user to add or change media content. In the example shown, the user is adding or changing video content. The disclosed implementations are also applicable to other types of content (e.g., audio content, images, etc.).

In some implementations, the user interface 300 displays thumbnail images 304 of video clips that are available for posting. The thumbnail images 304 can show sample frames from the available video clips. The user can also search for video clips by entering a query in search box 302. In some implementations, the user selects a video by clicking on, or otherwise interacting with, the thumbnail image for the video. In some other implementations, the user selects one or more videos by checking the checkbox(es) corresponding to the desired video(s) and pressing a button, such as a "Select Video(s)" button. In the example shown, the user has selected Video A by checking the corresponding checkbox. In some implementations, when one or more videos are selected the user is presented with a user interface 400 as shown in FIG. 4.

FIG. 4 illustrates an example user interface 400 for allowing a user to select an advertiser associated with video content. In some implementations, a video clip selected by a user is tied to one or more advertisers who have licensed the content for the targeting of ads. For example, the advertisers may have entered into a bidding process (e.g., an auction) to obtain the right for users to post content on one or more of the user's online properties. In the example shown, the user interface 400 includes a list of advertisers 402 who have one or more ads associated with the Video A. In some implementations, the advertisers selected by the user are stored in a database (e.g., database 114), which allows the user to post the same pre-approved content to multiple online properties associated with the user.

In some implementations, the user selects one or more advertisers by checking the checkboxes corresponding to the desired advertiser(s) and then pressing a button to continue on. In the example shown, the user has selected Advertiser N by selecting the corresponding checkbox. The user can opt to simply select the advertiser(s) and not select specific ads from the advertiser(s) for placement. On the other hand, the user can opt to select specific ads for placement. If the user opts to simply select the advertiser(s) and to not select specific advertisements, they can press a button such as the "Add selected videos . . . " button shown in FIG. 4 to complete the selection process. On the other hand, if the user wishes to select specific advertisements, the user can press another button such as the "select ads from selected advertiser(s)" button shown in FIG. 4 to continue through the process. In some implementations, when the user selects at least one advertiser and selects the "select ads from selected advertiser(s)" button, the user interface 500 is presented, as shown in FIG. 5.

FIG. 5 illustrates an example user interface 500 for allowing a user to select an ad associated with video content and an advertiser. In the example shown, the user can select from various banner and graphical ads. In some implementations, when the user clicks on the desired ad, the video content and the ad can be automatically uploaded to the user's personal space and displayed in the video display 204 and ad display 206, respectively. In some other implementations, the user selects one or more ads by checking the checkboxes corresponding to the desired ads and then pressing a button (e.g., the "Add selected video(s) and selected ad(s) to my content" button shown in FIG. 5). In the example shown, the user has selected Banner Ad B by checking the corresponding checkbox. In some implementations, the user can be provided with a link or other mechanism for entering into a revenue sharing arrangement with the ad targeting service provider. While reference is made to adding ads to a user's personal space, the ads may be served from a remote location and not included as part of the personal space content.

Figure 6:
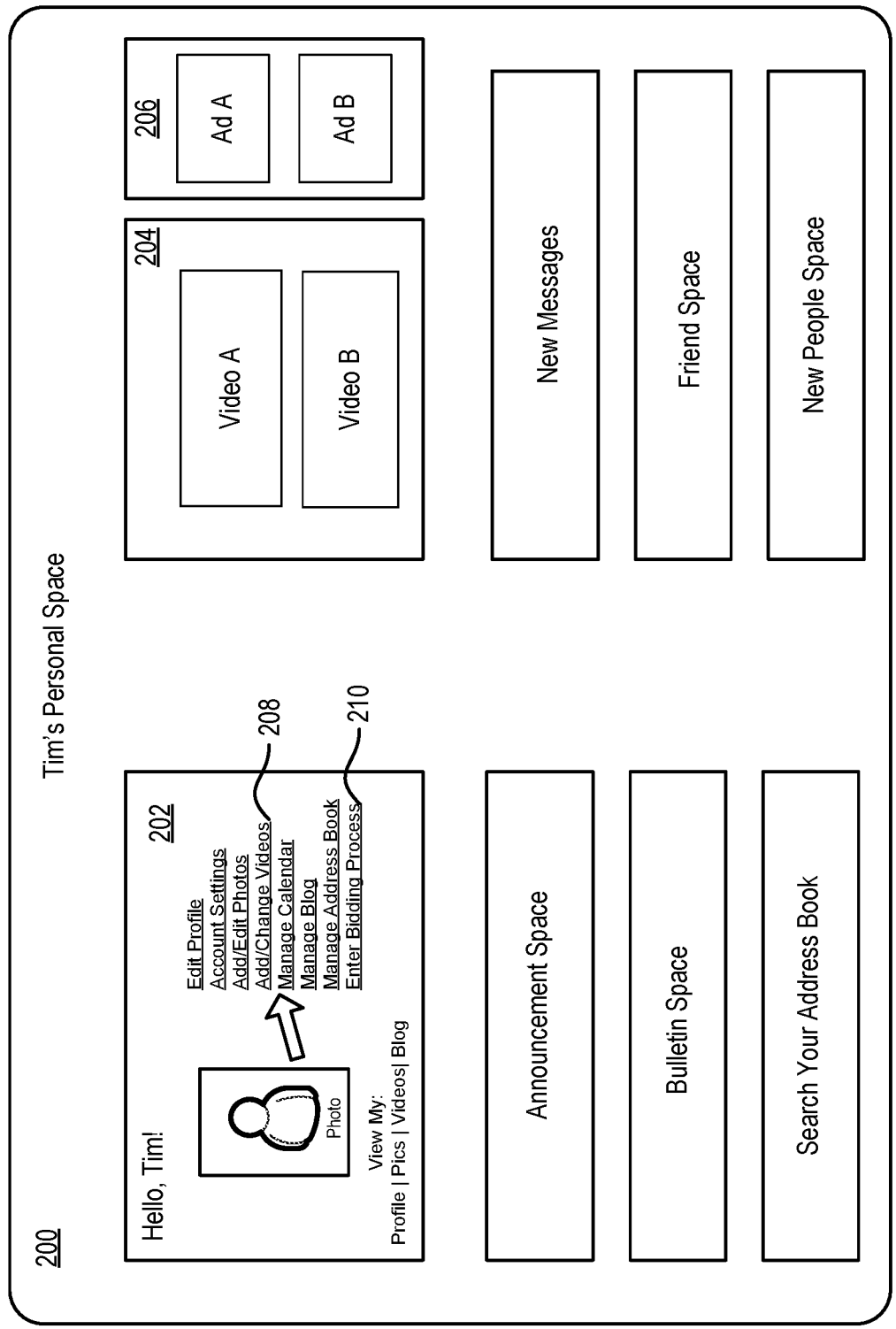
FIG. 6 illustrates an example user interface for an online property that allows a user to select and post content to their profile after the user has added sponsored content to their profile.

FIG. 6 illustrates an example user interface for an online property that allows a user to select and post content to their profile after the user has added sponsored content to their profile. After the user has added one or more video(s) and one or more ad(s), the added video(s) and ad(s) may be shown in the user interface 200. In the example shown, Video B is displayed or listed in the video display 204, and Ad B is displayed in the ad display 206.

User-Specified Online Advertising Process

Figure 7:
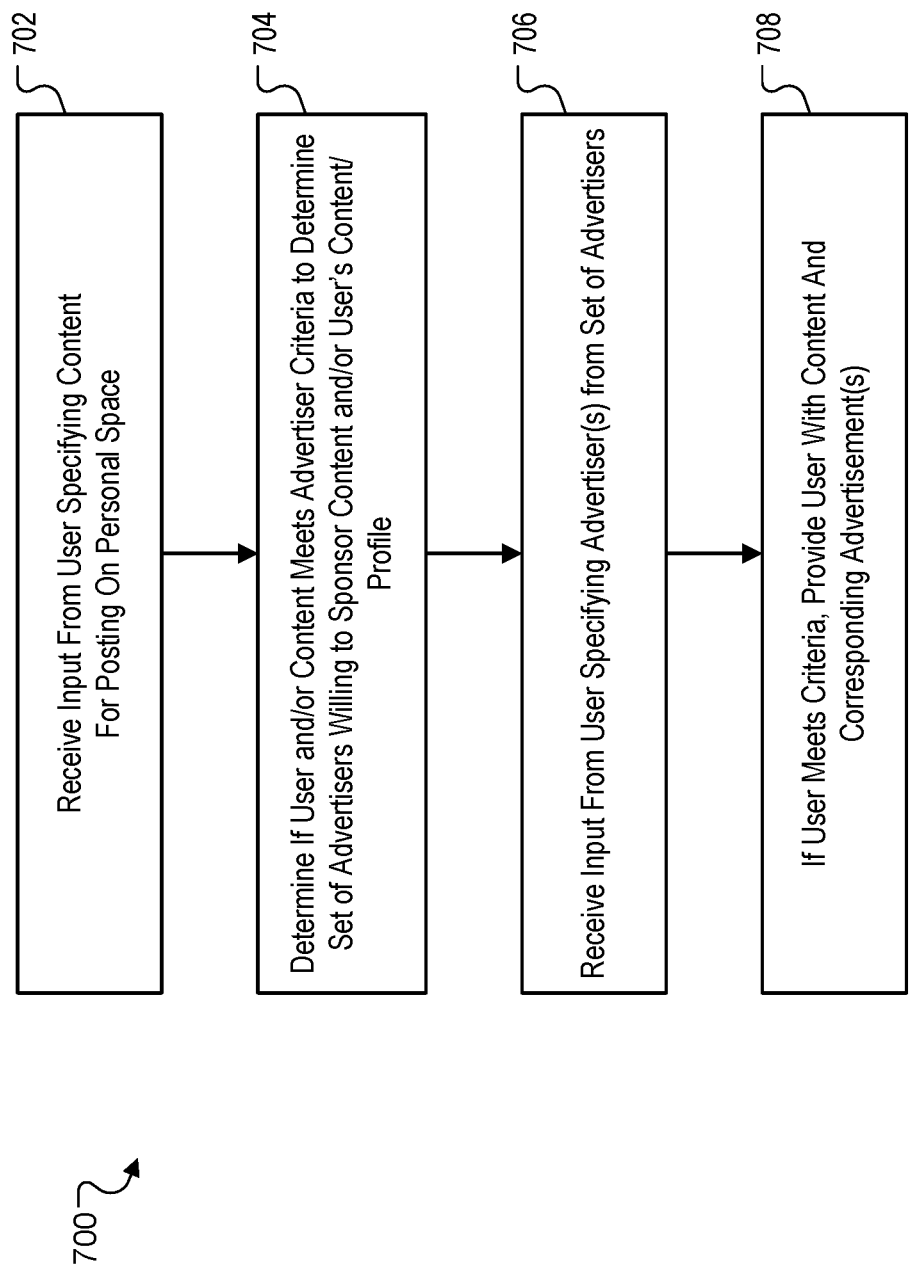
FIG. 7 is a flow diagram of an example user-specified online advertising process.

FIG. 7 is a flow diagram of an example user-specified online advertising process 700. The process 700 begins when input is received from a user specifying one or more content items (e.g., restricted content) for posting on one or more online properties of the user (702). For example, the user can select one or more videos in user interface 300 for posting in the user's personal space (e.g., user interface 200).

A determination is made as to whether the user and/or the content items meets certain criteria specified by one or more advertisers, to determine the set of advertisers willing to sponsor the content items and/or the user's content/profile (704). For example, user criteria can include a requirement that the user have certain demographics (e.g., age, gender, postal code, income), or have achieved a certain popularity ranking on the online property, if applicable. In some implementations, the popularity of the user can be measured by the popularity of the user's personal space on the online property. For example, a user can be considered "popular" if the user's personal space in a social network has a number of page views or unique visitors that is above some threshold. Content criteria may include a requirement that the content matches targeting criteria of the advertisers. If the user satisfies the user criteria and the content satisfies the content criteria of at least one advertiser, the advertiser(s) whose criteria are satisfied are presented to the user.

The targeting criteria of an advertiser specify the subject matter of content for which the advertiser is interested in placing ads. For example, a company advertising cars may target content that is related to cars but not content related to dining. In some implementations, an advertiser's targeting criteria can be specified by one or more keywords provided by the advertiser. The targeting keywords can be compared to words extracted from the content and/or content metadata to determine if the content satisfies the targeting criteria.

Input is received from the user specifying one or more advertisers from the set of advertisers willing to sponsor the selected content (706). For example, the user, in user interface 400, selects one or more advertisers which agreed to sponsor a video that was selected by the user for posting in his personal space. As described above, the user can simply select the advertisers or also select specific advertisements from the selected advertisers.

If the user meets the criteria, then the user is provided with the content and corresponding advertising for posting on the user's one or more online properties (708). The selected content and advertisements from the selected sponsors are posted in the personal space of the user and other users who access the personal space can view the selected content and advertisements.

If the user does not meet the user criteria of any advertiser or if the user-selected content does not meet the content criteria of any of the advertisers, the user is not permitted to post the selected content in his online property.

In some implementations, an advertiser can refuse to sponsor a content item if particular criteria are satisfied. For example, if the user satisfies one or more user exclusion criteria (e.g., matching one or more blacklist demographics, such as an age that is below or above some range, etc.), if the online property of the user satisfies one or more property exclusion criteria (e.g., the online property of the user includes objectionable content), or if the content item selected by the user satisfies one or more content exclusion criteria (e.g., the content item includes objectionable content or other blacklisted content), the advertiser can refuse to sponsor the user, the online property, or the content item, the effect being that advertisements by the advertiser is excluded from presentation in the online property of the user and/or along with the content item.

Ad Targeting System Architecture

Figure 8:
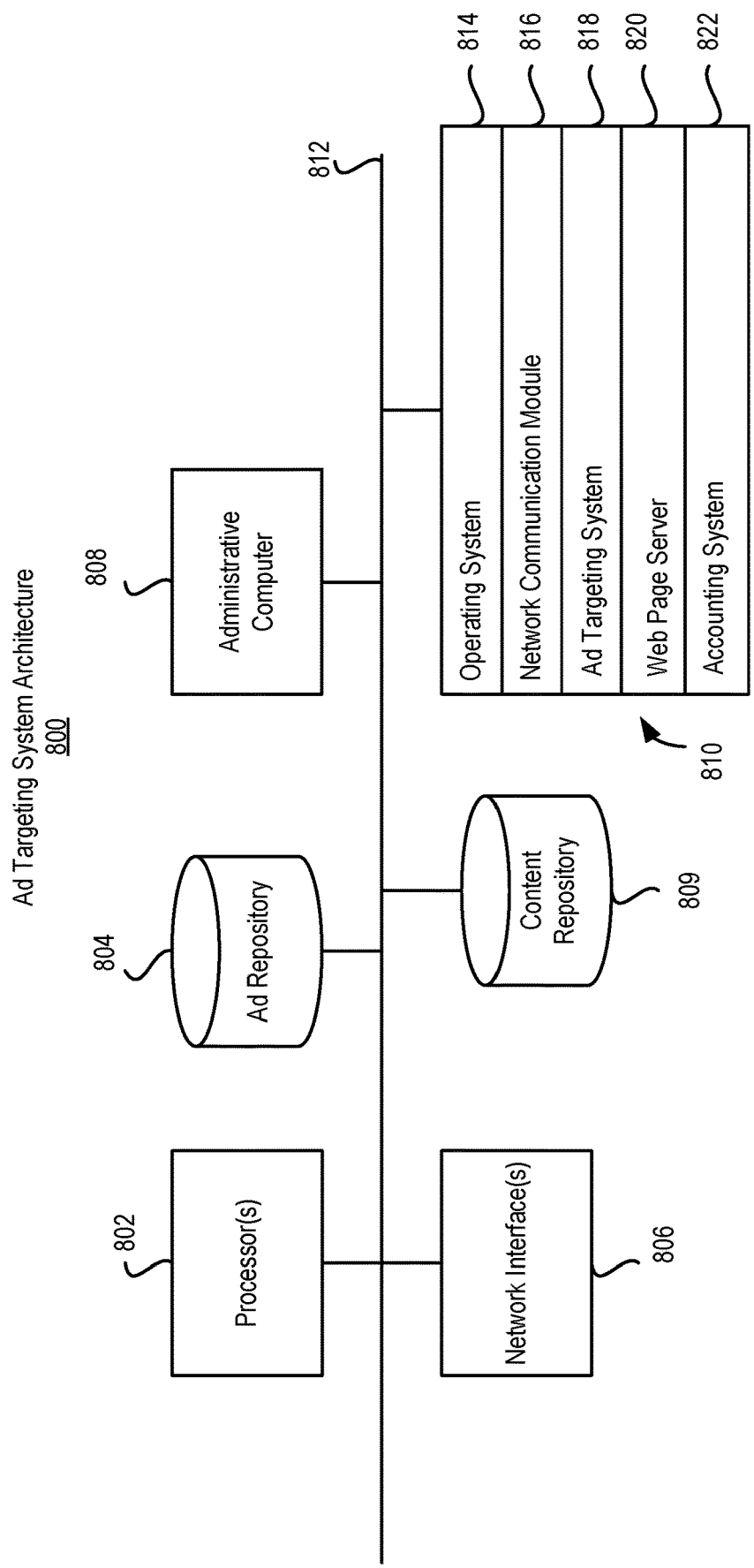
FIG. 8 is a block diagram of an example ad targeting system architecture.

FIG. 8 is a block diagram of an example ad targeting system architecture 800. In some implementations, the architecture 800 includes one or more processors 802 (e.g., dual-core Intel® Xeon® Processors), an ad repository 804, one or more network interfaces 806, a content repository 809, an optional administrative computer 808 and one or more computer-readable mediums 810 (e.g., RAM, ROM, SDRAM, hard disk, optical disk, flash memory, SAN, etc.). These components can exchange communications and data over one or more communication channels 812 (e.g., Ethernet, Enterprise Service Bus, PCI, PCI-Express, etc.), which can include various known network devices (e.g., routers, hubs, gateways, buses) and utilize software (e.g., middleware) for facilitating the transfer of data and control signals between devices.

The term "computer-readable medium" refers to any medium that participates in providing instructions to a processor 802 for execution, including without limitation, non-volatile media (e.g., optical or magnetic disks), volatile media (e.g., memory) and transmission media. Transmission media includes, without limitation, coaxial cables, copper wire and fiber optics. Transmission media can also take the form of acoustic, light or radio frequency waves.

The computer-readable medium 810 further includes an operating system 814 (e.g., Mac OS® server, Windows® NT server), a network communication module 816 and an ad targeting application 818. The operating system 814 can be multi-user, multiprocessing, multitasking, multithreading, real time, etc. The operating system 814 performs basic tasks, including but not limited to: recognizing input from and providing output to the administrator computer 808; keeping track and managing files and directories on computer-readable mediums 810 (e.g., memory or a storage device); controlling peripheral devices (e.g., repositories 804, 809); and managing traffic on the one or more communication channels 812. The network communications module 816 includes various components for establishing and maintaining network connections (e.g., software for implementing communication protocols, such as TCP/IP, HTTP, etc.).

The computer-readable medium 810 includes an ad targeting system 818, which is responsible for providing the features and functions described in reference to FIGS. 2-7. For example, the ad targeting system 818 lets advertisers specify the content they are willing to sponsor and the criteria for sponsorship. A web page server 802 is provided for generating the user interfaces described in reference to FIGS. 2-6. An accounting system 822 is provided for handling the accounting of payment schemes described herein (e.g., revenue sharing).

The architecture 800 is one example of a suitable architecture for hosting an ad targeting application. Other architectures are possible, which include more or fewer components. For example, the ad repository 804 and content repository 809 can be the same storage device or separate storage devices. The components of architecture 800 can be located in the same facility or distributed among several facilities. The architecture 800 can be implemented in a parallel processing or peer-to-peer infrastructure or on a single device with one or more processors. The ad targeting system 818 can include multiple software components or it can be a single body of code. Some or all of the functionality of the ad targeting system 818 can be provided as a service to content providers, advertisers and users over a network. In such a case, these entities may need to install client applications. Some or all of the functionality of the ad targeting system 818 can be provided as part of a search engine and can use information gathered by the search engine to target ads.

It should be appreciated that while the implementations described above describe sponsorship of content in an online environment, the above-described implementations can be adapted for other media, such as audio and print. For example, audio content can be sponsored by advertisers for inclusion into a radio broadcast or an audio podcast in exchange for insertion of advertisements provided by the advertisers into the radio broadcast or audio podcast.

The disclosed and other embodiments and the functional operations described in this specification can be implemented in digital electronic circuitry, or in computer software, firmware, or hardware, including the structures disclosed in this specification and their structural equivalents, or in combinations of one or more of them. The disclosed and other embodiments can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed embodiments can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed embodiments can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what being claims or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. A system for configuring online properties, the system comprising:
   one or more memory devices storing machine executable instructions and a content repository of video files that include restricted third party content;
   one or more processors that interact with the one or more memory devices and generate an online user interface through which an online property is configurable, wherein the one or more processors perform operations including:
      receiving, over a network and through a first instance of the online user interface presented by a first client device, a first request to insert a video file that includes restricted third party content into a first user's online property;
      in response to determining that a number of page views of the first user's online property is above a specified threshold, providing, over the network and to the first client device, data for updating the first instance of the online user interface to inform the first user that inclusion of the video file in the first user's online property is restricted and to provide the first user with one or more options for satisfying requirements for including the video file in the first user's online property;
      in response to detecting the first user's selection of the at least one of the one or more options:
         providing the video file from the content repository of video files that include restricted third party content;
         inserting the video file into the first user's online property; and
         presenting additional content on the first user's online property during presentation of the video file on the first user's online property;
      receiving, over the network and through a second instance of the online user interface presented by a second client device, a second request to insert the video file that includes restricted third party content into a second user's online property; and
      in response to determining that a number of page views of the second user's online property is not above the specified threshold, not providing the video file from the content repository of video files that include restricted third party content for insertion into the second user's online property.

2. The system of claim 1, wherein the first user's online property and the second user's online property each comprise a different content page of a website.

3. The system of claim 1, wherein the one or more options for satisfying requirements for including the video file in the first user's online property includes an option to select one or more content sponsors from a set of content sponsors, wherein the operations further comprise:
   detecting user selection of at least one content sponsor from the set of content sponsors; and
   in response to detecting user selection of the at least one content sponsor, inserting a sponsored content item that is associated with a selected content sponsor into the first user's online property.

4. The system of claim 3, wherein the operations further comprise:
   determining, for a particular content sponsor, that the first user satisfies one or more user criteria specified by the content sponsor, wherein the particular content sponsor is included in the set of content sponsors in response to the determining.

5. The system of claim 4, wherein the one or more user criteria specified by the content sponsor includes a user criterion that a number of views of the first user's online property meets a threshold value.

6. The system of claim 3, wherein the operations further comprise:
   determining, for a particular content sponsor, that the video file that includes restricted third party content satisfies one or more subject matter criteria specified by the content sponsor, wherein the particular content sponsor is included in the set of content sponsors in response to the determining.

7. The system of claim 6, wherein the one or more subject matter criteria specified by the content sponsor includes a subject matter criterion that one or more keywords specified by the content sponsor matches one or more descriptors associated with the video file that includes restricted third party content.

8. The system of claim 1, wherein the one or more options for satisfying requirements for including the video file that includes restricted third party content in the first user's online property includes an option to select one or more sponsored content items from a set of sponsored content items, wherein the operations further comprise:
  detecting user selection of at least one sponsored content item from the set of sponsored content items; and
  in response to detecting user selection of the at least one sponsored content item, inserting a selected sponsored content item into the first user's online property.

9. The system of claim 8, wherein the operations further comprise:
  providing, over the network and to the first client device, data for updating the first instance of the online user interface to present the first user with a set of visual representations of sponsored content items, each visual representation corresponding to a different sponsored content item from the set of sponsored content items.

10. The system of claim 8, wherein the selected sponsored content item is a static graphic, wherein the operations further comprise:
  presenting the video file that includes restricted third party content on the first user's online property while displaying the static graphic on the first user's online property.

11. A method for configuring online properties, the method comprising:
  receiving, through a first instance of an online user interface, a first request to insert a video file that includes restricted third party content into a first user's online property;
  in response to determining that a number of page views of the first user's online property is above a specified threshold, updating the first instance of the online user interface to inform the first user that inclusion of the video file in the first user's online property is restricted and to provide the first user with one or more options for satisfying requirements for including the video file in the first user's online property;
  in response to detecting the first user's selection of the at least one of the one or more options:
    providing the video file from a content repository of video files that include restricted third party content;
    inserting the video file into the first user's online property; and
    presenting additional content on the first user's online property during presentation of the video file on the first user's online property;
  receiving, through a second instance of the online user interface, a second request to insert the video file that includes restricted third party content into a second user's online property; and
  in response to determining that a number of page views of the second user's online property is not above the specified threshold, not providing the video file from the content repository of video files that include restricted third party content for insertion into the second user's online property.

12. The method of claim 11, wherein the one or more options for satisfying requirements for including the video file in the first user's online property includes an option to select one or more content sponsors from a set of content sponsors, wherein the method further comprises:
  detecting user selection of at least one content sponsor from the set of content sponsors; and
  in response to detecting user selection of the at least one content sponsor, inserting a sponsored content item that is associated with a selected content sponsor into the first user's online property.

13. The method of claim 12, further comprising:
  determining, for a particular content sponsor, that the first user satisfies one or more user criteria specified by the content sponsor, wherein the particular content sponsor is included in the set of content sponsors in response to the determining.

14. The method of claim 13, wherein the one or more user criteria specified by the content sponsor includes a user criterion that a number of views of the first user's online property meets a threshold value.

15. The method of claim 12, further comprising:
  determining, for a particular content sponsor, that the video file that includes restricted third party content satisfies one or more subject matter criteria specified by the content sponsor, wherein the particular content sponsor is included in the set of content sponsors in response to the determining.

16. The method of claim 15, wherein the one or more subject matter criteria specified by the content sponsor includes a subject matter criterion that one or more keywords specified by the content sponsor matches one or more descriptors associated with the video file that includes restricted third party content.

17. The method of claim 11, wherein the one or more options for satisfying requirements for including the video file that includes restricted third party content in the first user's online property includes an option to select one or more sponsored content items from a set of sponsored content items, wherein the method further comprises:
  detecting user selection of at least one sponsored content item from the set of sponsored content items; and
  in response to detecting user selection of the at least one sponsored content item, inserting a selected sponsored content item into the first user's online property.

18. The method of claim 17, further comprising:
  updating the first instance of the online user interface to present the first user with a set of visual representations of sponsored content items, each visual representation corresponding to a different sponsored content item from the set of sponsored content items.

19. The method of claim 17, wherein the selected sponsored content item is a static graphic, wherein the method further comprises:
  presenting the video file that includes restricted third party content on the first user's online property while displaying the static graphic on the first user's online property.

20. A non-transitory computer readable medium having instructions stored thereon, which, when executed by one or more processors, cause the one or more processors to perform operations comprising:
  receiving, through a first instance of an online user interface, a first request to insert a video file that includes restricted third party content into a first user's online property;
  in response to determining that a number of page views of the first user's online property is above a specified threshold, updating the first instance of the online user interface to inform the first user that inclusion of the video file in the first user's online property is restricted and to provide the first user with one or more options for satisfying requirements for including the video file in the first user's online property;

in response to detecting the first user's selection of the at least one of the one or more options:
  providing the video file from a content repository of video files that include restricted third party content;
  inserting the video file into the first user's online property; and
  presenting additional content on the first user's online property during presentation of the video file on the first user's online property;
receiving, through a second instance of the online user interface, a second request to insert the video file that includes restricted third party content into a second user's online property; and
in response to determining that a number of page views of the second user's online property is not above the specified threshold, not providing the video file from the content repository of video files that include restricted third party content for insertion into the second user's online property.

* * * * *

UNITED STATES PATENT AND TRADEMARK OFFICE
CERTIFICATE OF CORRECTION

PATENT NO. : 10,896,448 B2
APPLICATION NO. : 15/149789
DATED : January 19, 2021
INVENTOR(S) : Armstrong Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1156 days.

Signed and Sealed this
Fourth Day of October, 2022

Katherine Kelly Vidal
*Director of the United States Patent and Trademark Office*